United States Patent [19]
Geelhoed

[11] Patent Number: 5,707,175
[45] Date of Patent: Jan. 13, 1998

[54] EXCAVATING AND PIPE LAYING MACHINES

[75] Inventor: Jack Geelhoed, Boston, United Kingdom

[73] Assignee: J. Mastenbroek & Company Limited, Boston, Great Britain

[21] Appl. No.: 374,799

[22] PCT Filed: Aug. 25, 1993

[86] PCT No.: PCT/GB93/01811

§ 371 Date: Feb. 15, 1995

§ 102(e) Date: Feb. 15, 1995

[87] PCT Pub. No.: WO94/05864

PCT Pub. Date: Mar. 17, 1994

[30] Foreign Application Priority Data

Aug. 27, 1992 [GB] United Kingdom ............... 9218237

[51] Int. Cl.⁶ .................. E02F 5/10; F16L 1/036
[52] U.S. Cl. ............. 405/180; 405/174; 405/154; 414/745.4; 414/797.9
[58] Field of Search .................... 405/154, 174, 405/177, 180, 183; 221/251, 197, 124; 414/797.9, 745.4, 745.7

[56] References Cited

U.S. PATENT DOCUMENTS

| | | |
|---|---|---|
| 1,463,561 | 7/1923 | Sommer ................... 405/179 X |
| 3,421,609 | 1/1969 | Schmunk . |
| 3,514,962 | 6/1970 | Poole ................ 414/745.4 X |
| 3,831,388 | 8/1974 | Wells ................... 405/157 |
| 4,111,374 | 9/1978 | Mackaness . |
| 4,363,594 | 12/1982 | Morin ................... 414/745.4 |
| 4,714,381 | 12/1987 | Hatch .................. 405/178 |

FOREIGN PATENT DOCUMENTS

| | | |
|---|---|---|
| 3914736 | 7/1991 | Germany . |
| 653077 | 12/1985 | Sweden ................. 405/174 |
| 302449 | 4/1971 | U.S.S.R. ............... 405/174 |
| 1076544 A | 2/1984 | U.S.S.R. . |
| 1461831 | 2/1989 | U.S.S.R. ............... 405/180 |
| 1724821 A1 | 4/1992 | U.S.S.R. . |
| 1735506 A1 | 5/1992 | U.S.S.R. . |
| 1301405 | 12/1972 | United Kingdom . |

*Primary Examiner*—Tamara L. Graysay
*Assistant Examiner*—Frederick L. Lagman
*Attorney, Agent, or Firm*—Cushman, Darby & Cushman IP Group of Pillsbury Madison & Sutro LLP

[57] ABSTRACT

A pipe laying machine comprises a vehicle carrying a trench excavator followed by a pipe laying box running in the trench. Pipe lengths are stored in the pipe laying box one above another and the lowermost pipe length is periodically released by movement of bars into the bottom of the pipe laying box and is pressed by a ram into the mouth of the last laid pipe length.

19 Claims, 2 Drawing Sheets

EXCAVATING AND PIPE LAYING MACHINES

The present invention relates to excavating and pipe laying machines of the kind which comprise a vehicle carrying excavating means which is used to dig a trench into which individual lengths of pipe are laid, joins between the pipe lengths being made by forcing the latest laid pipe length into the mouth of the previously laid pipe length.

Machines of this type are described in German Specification DE 3914736. In practice using machines of this type at present individual pipe lengths are lowered by crane into the trench through a pipe box carried by the vehicle immediately behind the excavating means. The pipe box extends down to the bottom of the trench and provides an enclosure within which the pipe laying activity can be conducted without risk of the walls of the trench falling in this zone. One or more hydraulic rams acting through cables are used to push the latest laid pipe length into the mouth of the preceding one to form a joint, the pipe lengths exiting from the pipe box through an aperture at the lower rear of the box.

Whilst machines of this type are able to lay pipe lengths at an increased rate in comparison to previous systems we have appreciated that the full potential of machines of this kind is not yet being realised. In particular, the operation of lowering individual pipe lengths through the pipe box to the bottom of the trench for laying necessitates the halting of the excavating machine for the loading of each individual pipe length. Also, lowering each pipe length down the entire the depth of the pipe box entails a risk of damage to the pipe length due to collisions between the pipe length and the pipe box walls.

Accordingly, the present invention provides a pipe laying machine comprising a vehicle carrying excavating means for excavating a trench, a pipe laying box behind said excavating means which in use is positioned in the excavated trench, means in said pipe laying box for pressing a length of pipe positioned in use at the bottom of said box into connection with an immediately previously laid pipe length, and means in said pipe laying box for holding a supply of lengths of pipe and releasing said lengths one by one into the bottom of said box for laying.

Thus according to the invention the pipe laying box is converted into a magazine containing a number of lengths of pipe ready for laying which are released one by one as required into the pipe laying location at the bottom of the pipe laying box. Because pipe lengths can be added to the top of the pipe laying box to be supported by the pipe lengths already in the magazine so that they do no longer have to be lowered through the depth of the pipe laying box, the task of loading pipe lengths is much easier and can be conducted much more rapidly, typically whilst the excavating vehicle is moving and working. The risk of damage to the pipe lengths is reduced. Furthermore, if plastics pipe lengths are used they can be loaded into the top of the magazine manually without the need for a crane which would not be possible if they had to be lowered to the bottom of the pipe box and correctly positioned one by one. Alternatively, pipe lengths may be added to the content of the magazine by a conveyor system.

Preferably, the pipe holding and releasing means comprises means defining a "ready to release" position for a lowermost pipe length in said supply of lengths of pipe, which means is moveable between a first position in which the lowermost pipe length is receivable into said ready to release position and a second position in which the pipe length in said ready to release position is released to be laid and the next pipe length in said supply is held up from moving into said ready to release position.

Returning the pipe holding and releasing means to the first position thereof will result in the next pipe length in the supply coming into the ready to release position but being prevented from carrying on down into the pipe laying position.

A suitable pipe holding and releasing means may comprise on one or each side of a path of passage for said pipe lengths a pair of pipe support members, a lower one of said pipe support members in the or each said pair being moveable between a said first position in which it protrudes into said path of passage to catch the lowermost pipe length in said ready to release position and a second position in which it is retracted from said path of passage, and an upper one of said pipe support members in the or each pair being moveable in synchrony with said first one between a first position in which it is retracted from said path of passage and a second position in which it protrudes into said path of passage above said ready to release position to catch the next pipe length in said supply.

Conveniently, the or each pair of pipe support members may be carried for pivotal movement about a respective pivot axis, the pivot axis lying on one side of said path of passage or the axes lying one on each side of said path of passage if there are two said pairs, e.g. by each pipe support member being positioned at one of a respective arm extending between said support member and its respective pivot axis.

The pipe holding and releasing means may be hydraulically or pneumatically actuated or actuated by electric servo controls.

Means may be provided for automatically halting the excavating vehicle briefly whilst the next pipe length is released into the bottom of the pipe laying box for laying. Such means may be actuated by sensors determining when the previous pipe length has reached the required position toward the rear of the pipe laying box for the next pipe length to be released. Such sensors may for instance be optical sensors or micro switches. Automatic means may also be provided for restarting the movement of the excavating machine once the next pipe length has been released into the laying position.

However, more preferably the machine will be driven forward continuously in normal use. A sensor may be employed to determine when the upstream end of the last laid pipe length has passed sufficiently far through the pipe laying box for the next length of pipe to be released into the laying position, release of the next pipe length may then be triggered and the next pipe length once released may be pressed into the mouth of the last laid pipe length. The sensor may be used to check that the said next pipe length has actually been supplied and arrangements may be made to stop the machine if the said next pipe length has not reached the pipe laying position within a certain time or before a further sensor senses that the last laid pipe length has reached a predetermined position with respect to the exit from the pipe laying box.

Pressure may be maintained on each pipe length as it is being laid, e.g. at a preset level by means such as an hydraulic ram, the action of which may be synchronised with respect to the forward speed of the trencher until the pipe length has moved a predetermined distance through the pipe laying box.

Whilst the pipe holding and releasing means may be simply provided directly in the pipe laying box of the machine, as an alternative a separate magazine in the form of an open bottomed box may be provided to be lowered into the pipe laying box of a machine which is essentially as presently known, the magazine being provided with said pipe holding and releasing means. Such a separate magazine may either be fitted simply to convert a prior art machine to work according to the principles of the invention, the magazine remaining in situ once fitted and being loaded in situ or else the magazine may be loaded outside the pipe laying box in which it is to fit and may then be fitted in place. Once emptied, the magazine may be removed and replaced by a full magazine.

The invention includes a pipe laying box for a pipe laying machine, said pipe laying box comprising means in said pipe laying box for holding a supply of lengths of pipe and releasing said lengths one by one into the bottom of said box for laying.

The invention further includes a magazine for lowering into a pipe laying box, said magazine being adapted to hold a supply of lengths of pipe and comprising means for holding a supply of lengths of pipe and releasing said lengths one by one from the open bottom of the magazine for laying.

The invention will be further described and illustrated by the following description of a preferred embodiment with reference to the accompanying drawings in which.

Figure 1:
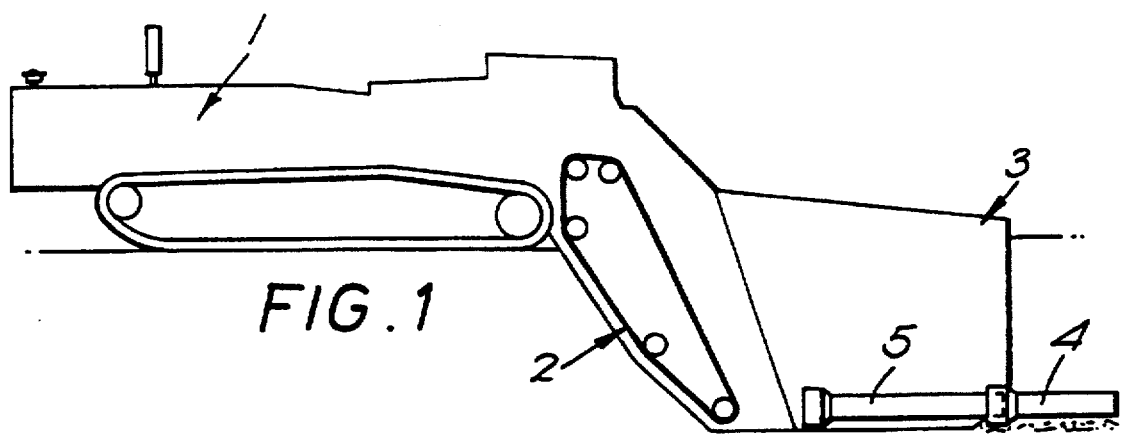
FIG. 1 is a schematic side elevation (taken from German Specification No. 3914736) of a machine according to the prior art.

The pipe laying machine shown in FIG. 1 comprises a tracked vehicle unit 1 provided with a continuous excavating conveyor 2 having excavating buckets carried on a continuous chain and suitably powered for movement in a known manner to dig a trench. Immediately behind the excavating conveyor located in the dug trench is a pipe laying box 3. A pipe line 4 consisting of previously laid lengths of pipe extends from the rear of the machine and a length of pipe 5 currently being laid is positioned at the bottom of the pipe laying box and is being pushed into the mouth of the pipe line 4 by ram means schematically shown at 6 in FIG. 2.

Figure 2:
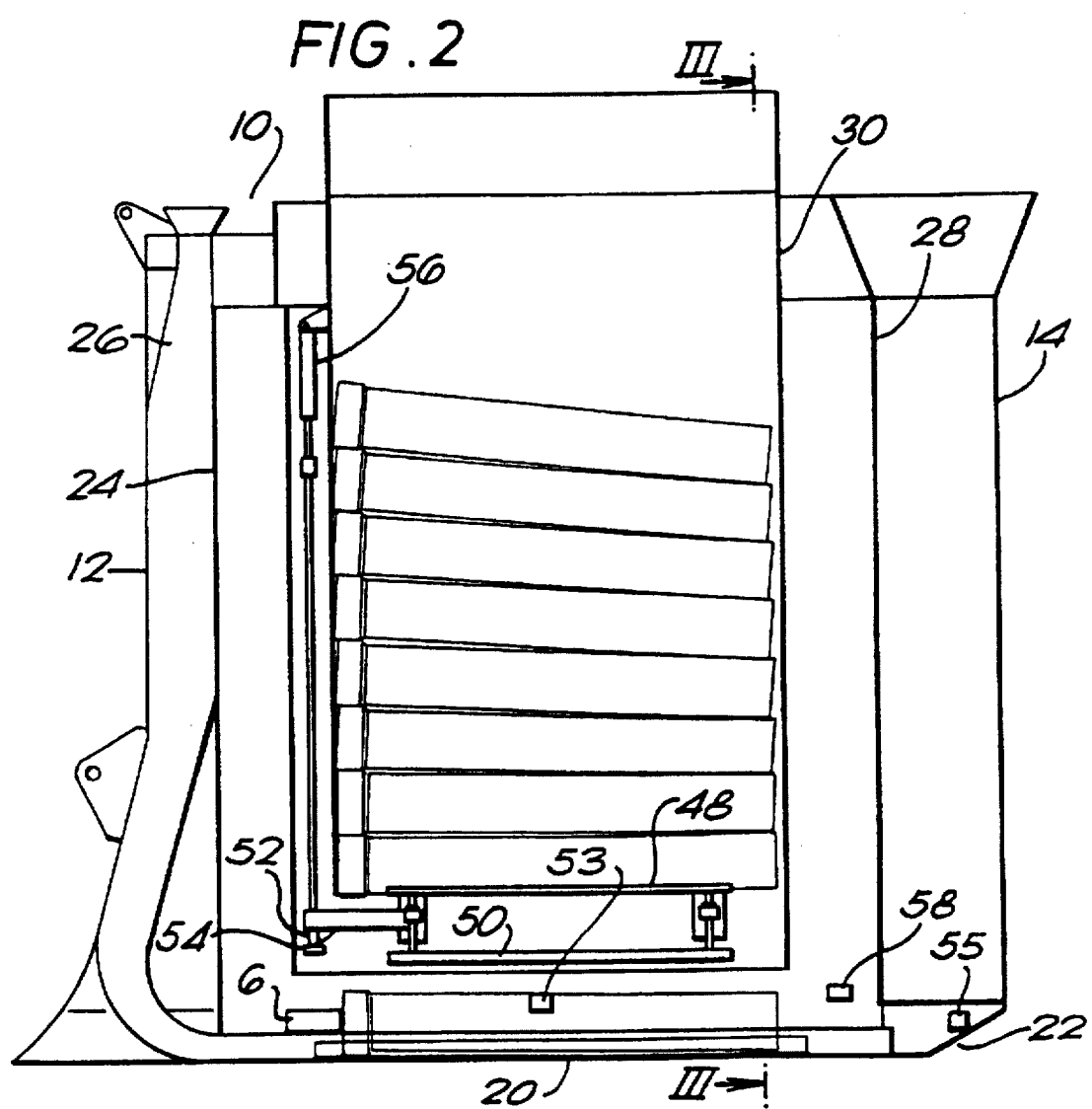
FIG. 2 is a sectional side elevation of the pipe laying box of a machine according to the invention.
Figure 3:
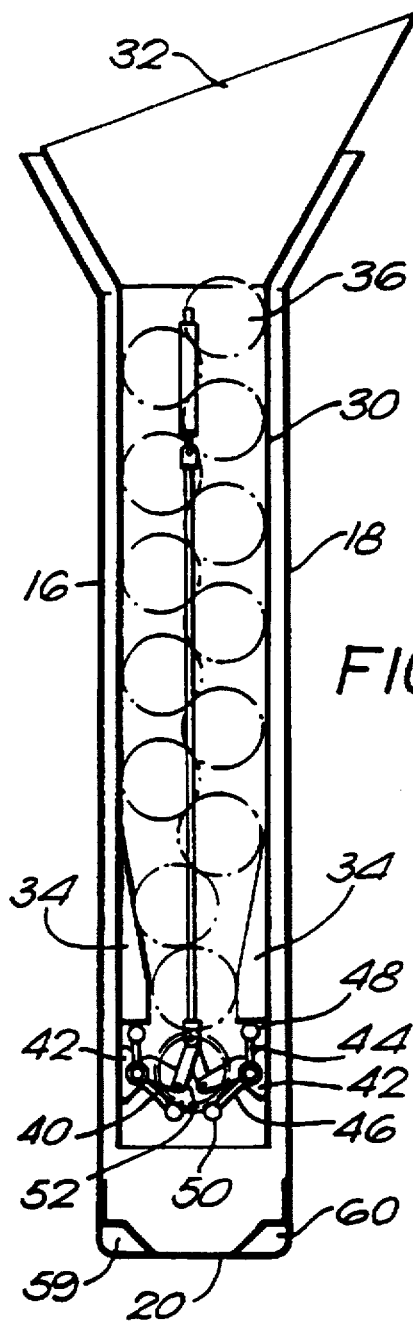
FIG. 3 is a section on the line III—III in FIG. 2 but showing the pipe holding and releasing means in its second position.
Figure 4:
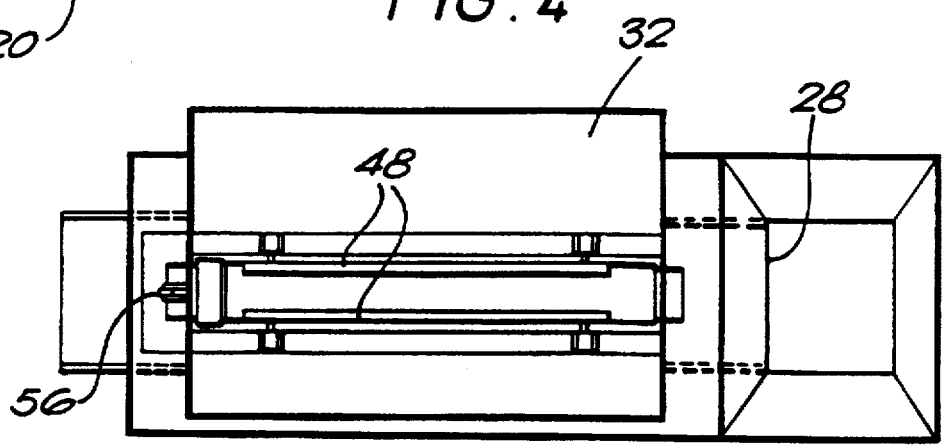
FIG. 4 is a plan view of the pipe laying box shown in FIG. 2.

A modified form of pipe laying box for use according to the invention is shown in FIGS. 2 to 4. The box 10 comprises a front vertically running wall 12, a rear vertically running wall 14 and opposed vertically running side walls 16, 18 (FIG. 3) and has a bottom wall 20. An aperture 22 is provided at the base of the rear wall 14 to allow pipe lengths to escape as they are laid. The forward part of the pipe laying box is provided with a bulkhead 24 separating a vertically running forward compartment 26 which extends down to the bottom of the pipe laying box and is formed into a pair of shaped tubular cavities through which can be passed one or more flexible drainage pipes to be laid continuously in the bottom of the trench being dug. The drainage pipes exit from the pipe laying box through apertures 59, 60 (FIG. 3). A drainage pipe of this kind may be used for pumping out water from the trench to keep it dry for as long as desired during the installation of the main pipe. The rear part of the pipe laying box is separated by a bulkhead 28 to define an open bottomed gravel box through which may be supplied aggregate such as gravel for forming a bedding for a pipe line to be laid.

The main part of the pipe laying box lies between the bulkheads 24 and 28 and receives from its open mouth a magazine 30 in the form of a rectangular box having an open bottom and an open top, the open top being provided with an enlargement forming a hopper 32. Guides 34 provided towards the bottom of the box form a narrowing neck sufficiently wide to accommodate the passage of only one pipe length 36 at a time. The width of the neck defined by guides 34 may be adjustable to cater for varying pipe diameters. Above the neck formed by the guides 34, the pipe box is sufficiently wide to accommodate two overlapping columns of pipe lengths 36. Below the guides 34, pipe holding and releasing means define a ready to release position 40 (FIG. 3) for the lowermost pipe length in the magazine. The pipe holding and releasing means comprises forward and a rearward pair of inwardly protruding brackets 42 each having pivoted thereon an arm 44 and a second arm 46 extending at a fixed angle with respect to the arm 44. The pair of arms 44 on each side of the path of passage of pipe lengths 36 are connected to one another by respective bar 48 connecting the outward ends of the arms 44 and each pair of arms 46 are connected to one another by a similar bar 50 connecting their outward ends. Pivoting movement of the arms 44, 46 is controlled by an arrangement of linkage arms 52 at the forward end of the magazine forward of the front wall of the magazine which are connected to longitudinally extending connection rods 54 which at their rearward ends are in turn connected to and form the pivot axis for the inward ends of the arms 44, 46. The linkage arms 52 are driven for movement by an hydraulic actuator 56 mounted to the exterior side of the forward wall of the magazine. Raising the linkages 52 brings the bars 48, 50 into the position shown in FIG. 3, which is their first position. In this position the lowermost pipe length 36 in the stack is supported in the ready to release position 40. Lowering the linkage arms 52 causes pivoting of the arms 44, 46 to bring the bars 48 inwards into the dropping path or path of passage of the pipe lengths 36 and to bring the bars 50 outwards away from the path of drop. This allows the pipe length 36 in the ready to release position 40 to fall to the bottom of the pipe box whilst the bars 48 hold up the next pipe length 36 in the stack in the mouth between the guides 34. This is the second position of the pipe holding and releasing means. Returning the pipe holding and releasing means to its first position allows the next pipe in the stack to fall to the ready to release position.

An optical sensor schematically illustrated at 58 may be used to determine when the upstream end of the last pipe length laid is approaching the rear of the pipe box. Triggering of the sensor 58 may be used to halt the excavating machine and to actuate the pipe holding and releasing means to release a pipe length 36 to the bottom of the pipe box. There it is engaged by hydraulic ram means 6 of a known type and is driven rearwardly into the mouth of the pipe line 4 so as to form a seal with the last laid pipe length. The excavating machine restarts and drives forward.

More preferably, when sensor 58 detects the passage of the upstream end of the last laid pipe length out of the dropping zone for the next pipe length, the ram 6 which has been maintaining a steady pressure or pushing force on the pipe to force it into its joint with the previous pipe length is withdrawn and a new length of pipe is dropped into the bottom of the pipe laying box. The ram is then returned and drives the new pipe length into the mouth of the last laid pipe length and thereafter maintains pressure on it as the machine drives forward without interruption of the machines forward movement. The arrival of a new pipe length in the pipe laying position may be detected by a second sensor 53 which can trigger the movement of the ram 6 to push the new pipe length.

A timer may be set by sensor 58 to stop the machine if no new pipe length reaches sensor 58 before the last pipe length is about to exit from the box, e.g. because the magazine is empty. Alternatively a further sensor 55 may be used to sense when this is about to happen and to stop the machine.

If with a particular type of pipe there is no need to maintain pressure from the ram 6 throughout the passage of a pipe length along the bottom of the pipe laying box, the distance travelled by the ram may be reduced. The sensor 53 may be used to detect the passage of the upstream end of the pipe length currently being laid and to cause the ram 6 to retract to the forward part of the pipe laying box. Continuing forward movement of the machine will pull the pipe line constructed by the pipe lengths rearwardly through the pipe laying box until sensor 58 is reached, whereupon a fresh pipe length is delivered and ram 6 is reactivated. Sensor 53 may be mounted adjustably fore and aft in the pipe laying box to allow the user to set the travel distance of ram 6.

As the machine drives forward or whilst it is stationary further lengths of pipe 36 may be loaded into the hopper of the magazine.

The pipe lengths may be of any suitable material including ceramic pipe lengths, concrete pipe lengths and plastics pipe lengths.

In a known manner, optical, e.g. laser tracking, equipment may be used to keep the excavating machine on line and to regulate the depth of the trench.

Whilst the invention has been illustrated with the reference to the specific embodiment described above, many modifications and variations thereof are possible within the scope of the invention. In particular, many alternative means for holding and releasing lengths of pipe from the "ready to drop position" may be used which will readily occur to those skilled in the art.

I claim:

1. A pipe laying machine comprising:
   a vehicle carrying excavating means for excavating a trench,
   a pipe laying box behind said excavating means which in use is positioned in the excavated trench,
   means in said pipe laying box for pressing a length of pipe positioned in use at the bottom of said box into connection with an immediately previously laid pipe length, and
   means in said pipe laying box for holding a supply of lengths of pipe and releasing said lengths one by one into the bottom of sad box for laying,
   said pipe laying box having a bottom wall adapted to receive a length of pipe from the pipe holding and releasing means, and said pipe holding and releasing means comprising means defining for a lowermost pipe length in said supply of lengths of pipe a ready-to-release position which is spaced upwardly from the position of a pipe length when in the bottom of the pipe laying box and from which the pipe length is released in operation to drop directly into the bottom of the box for laying,
   the means defining the ready-to-release position including means for holding up the next pipe length in said supply from moving into said ready-to-release position while the pipe length in the ready-to-release position is being released.

2. A machine as claimed in claim 1, wherein said pipe holding and releasing means comprises position defining means defining a ready-to-release position for a lowermost pipe length in said supply of lengths of pipe,
   said position defining means being moveable between a first position in which the lowermost pipe length is receivable into said ready-to-release position and a second position in which the pipe length in said ready-to-release position is released to be laid and the next pipe length in said supply is held up from moving into said ready-to-release position.

3. A machine as claimed in claim 2, wherein said pair of pipe support members is carried for pivotal movement about a respective pivot axis, the pivot axis lying on one side of said path of passage or the axes lying one on each side of said path of passage if there are two said pairs.

4. A machine as claimed in claim 3, wherein each pipe support member is positioned at one end of a respective arm extending between said support member and its respective pivot axis.

5. A pipe laying machine comprising:
   a vehicle carrying excavating means for excavating a trench,
   a pipe laying box behind said excavating means which in use is positioned in the excavated trench,
   means in said pipe laying box for pressing a length of pipe positioned in use at the bottom of said box into connection with an immediately previously laid pipe length, and
   means in said pipe laying box for holding a supply of lengths of pipe and releasing said lengths one by one into the bottom of sad box for laying;
   wherein said pipe holding and releasing means comprises position defining means defining a ready-to-release position for a lowermost pipe length in said supply of lengths of pipe,
   said position defining means being moveable between a first position in which the lowermost pipe length is receivable into said ready-to-release position and a second position in which the pipe length in said ready-to-release position is released to be laid and the next pipe length in said supply is held up from moving into said ready-to-release position.

6. A pipe laying machine comprising:
   a vehicle carrying excavating means for excavating a trench,
   a pipe laying box behind said excavating means which in use is positioned in the excavated trench,
   means in said pipe laying box for pressing a length of pipe positioned in use at the bottom of said box into connection with an immediately previously laid pipe length, and
   means in said pipe laying box for holding a supply of lengths of pipe and releasing said lengths one by one into the bottom of sad box for laying;
   wherein the pipe holding and releasing means comprises on at least one side of a path of passage for said pipe lengths a pair of pipe support members,
   a lower one of said pipe support members in said pair being movable between a first position in which it protrudes into said path of passage to catch a lowermost pipe length in a ready-to-release position and a second position in which it is retracted from said path of passage, and
   an upper one of said pair of pipe support members in said pair being moveable in synchrony with said first one between a first position in which it is retracted from said path of passage and a second position in which it protrudes into said path of passage above said ready-to-release position to catch a next pipe length in said supply.

7. A machine as claimed in claim 6, wherein said pair of pipe support members is carried for pivotal movement about a respective pivot axis, the pivot axis lying on one side of said path of passage.

8. A machine as claimed in claim 7, wherein each pipe support member is positioned at one end of a respective arm extending between said support member.

9. A machine according to claim 6 wherein the pipe holding and releasing means comprises a pair of pipe support members on each side of said path of passage for said pipe lengths, each said pair of pipe support members being carried for pivotal movement about a respective pivot axis, the axes lying one on each side of said path of passage.

10. A pipe laying box for a pipe laying machine, said pipe laying box comprising:

means in said pipe laying box for holding a supply of lengths of pipe and releasing said lengths one by one into the bottom of said box for laying, said pipe laying box having a bottom wall adapted to receive a length of pipe from the pipe holding and releasing means, and said pipe holding and releasing means comprising means defining for a lowermost pipe length in said supply of lengths of pipe a ready-to-release position which is spaced upwardly from the position of a pipe length when in the bottom of the pipe laying box and from which the pipe length is released in operation to drop directly into the bottom of the box for laying, the means defining the ready-to-release position including means for holding up the next pipe length in said supply from moving into said ready-to-release position while the pipe length in the ready-to-release position is being released.

11. A pipe laying box according to claim 10, wherein the means defining a ready-to-release position comprise on at least one side of a path of passage for said pipe lengths a pair of pipe support members, a lower one of said pipe support members in said pair being movable between a first position in which it protrudes into said path of passage to catch the lowermost pipe length in said ready-to-release position and a second position in which it is retracted from said path of passage, and an upper one of said pair of pipe support members in said pair being moveable in synchrony with said first one between a first position in which it is retracted from said path of passage and a second position in which it protrudes into said path of passage above said ready-to-release position to catch the next pipe length in said supply.

12. A pipe laying box according to claim 11 wherein said pair of pipe support members is carried for pivotal movement about a respective pivot axis, the pivot axis lying on one side of said path of passage.

13. A pipe laying box according to claim 12, wherein each pipe support member is positioned at one end of a respective arm extending between said support member and its respective pivot axis.

14. A pipe laying box according to claim 10, wherein said means defining a ready-to-release position is moveable between a first position in which the lowermost pipe length is receivable into said ready-to-release position, and a second position in which the pipe length in said ready-to-release position is released to be laid and the next pipe length in said supply is held up from moving into said ready-to-release position.

15. A magazine for use with a pipe laying machine, said magazine being adapted to hold a supply of lengths of pipe and comprising:

means for holding a supply of lengths of pipe and releasing said lengths one by one for laying, said magazine being adapted for lowering into a pipe laying box positioned in a trench behind excavating means for excavating the trench, said magazine having an open bottom through which lengths of pipe are released one by one so as to release pipes within the pipe laying box directly into the bottom of the box for laying, said pipe holding and releasing means comprising means defining for a lowermost pipe length in said supply of lengths of pipe a ready-to-release position from which the pipe length is released in operation to drop directly into the bottom of the box for laying, the means defining the ready-to-release position including means for holding up the next pipe length in said supply from moving into said ready-to-release position while the pipe length in the ready-to-release position is being released.

16. A magazine according to claim 15, wherein the means defining a "ready-to-release" position comprise on at least one side of a path of passage for said pipe lengths a pair of pipe support members, a lower one of said pipe support members in said pair being movable between a first position in which it protrudes into said path of passage to catch the lowermost pipe length in said ready-to-release position and a second position in which it is retracted from said path of passage, and an upper one of said pair of pipe support members in said pair being moveable in synchrony with said first one between a first position in which it is retracted from said path of passage and a second position in which it protrudes into said path of passage above said ready-to-release position to catch the next pipe length in said supply.

17. A magazine according to claim 16, wherein said pair of pipe support members is carried for pivotal movement about a respective pivot axis, the pivot axis lying on one side of said path of passage.

18. A magazine according to claim 17, wherein each pipe support member is positioned at one end of a respective arm extending between said support member and its respective pivot axis.

19. A magazine according to claim 15, wherein said means defining a ready-to-release position is moveable between a first position in which the lowermost pipe length is receivable into said ready-to-release position, and a second position in which the pipe length in said ready-to-release position is released to be laid and the next pipe length in said supply is held up from moving into said ready-to-release position.

\* \* \* \* \*

UNITED STATES PATENT AND TRADEMARK OFFICE
CERTIFICATE OF CORRRECTION

PATENT NO. : 5,707,175
DATED : January 13, 1998
INVENTOR(S) : Geelhoed It is certified that error appears in the above-identified patent and that said Letters Patent is hereby corrected as shown below:

FOREIGN PATENT OR PUBLISHED FOREIGN PATENT APPLICATION

| | | DOCUMENT NUMBER | | | | | PUBLICATION DATE | COUNTRY OR PATENT OFFICE | Inventor Name | TRANSLATION YES | NO |
|---|---|---|---|---|---|---|---|---|---|---|---|
| | | 5 | 2 | 7 | 4 | 6 | 0 | 8/1991 | Europe | Porziq | | |
| | | 5 | 6 | 5 | 5 | 0 | 2 | 10/1993 | Europe | Nyman | | |
| | | 5 | 8 | 5 | 1 | 8 | 8 | 3/1994 | Europe | Privat | | |
| | | | | | | | | | | | | |

Signed and Sealed this

Twenty-first Day of November, 2000

*Attest:*

Q. TODD DICKINSON

*Attesting Officer*  *Director of Patents and Trademarks*